US008216652B1

(12) United States Patent
Huang

(10) Patent No.: US 8,216,652 B1
(45) Date of Patent: Jul. 10, 2012

(54) COMPOSITION AND METHOD FOR MANUFACTURING CHLOROSULFONATED POLYETHYLENE LATEX AND ARTICLES

(76) Inventor: Wunan Huang, Greer, SC (US)

( * ) Notice: Subject to any disclaimer, the term of this patent is extended or adjusted under 35 U.S.C. 154(b) by 723 days.

(21) Appl. No.: 12/291,206

(22) Filed: Nov. 7, 2008

Related U.S. Application Data

(60) Provisional application No. 61/002,884, filed on Nov. 13, 2007.

(51) Int. Cl.
  *B32B 1/00* (2006.01)
  *B32B 27/08* (2006.01)
  *B32B 27/28* (2006.01)

(52) U.S. Cl. ............... 428/34.7; 428/34.1; 428/35.7; 428/332; 428/402

(58) Field of Classification Search ............ 428/35.7, 428/34.1, 332, 402
See application file for complete search history.

(56) References Cited

U.S. PATENT DOCUMENTS 6,495,612 B1 * 12/2002 Corzani et al. ............ 523/105
2004/0063832 A1 * 4/2004 Dzikowicz ............... 524/257

* cited by examiner

*Primary Examiner* — Brent Ohern

(57) ABSTRACT

Composition and method for manufacturing coagulable chlorosulfonated polyethylene latex and articles are disclosed. Chlorosulfonated polyethylene solid rubber is converted to chlorosulfonated polyethylene latex that can produce strong elastic dry film. Sodium alkylbenzene sulfonate is used as an emulsifier to provide stable emulsion of ionic chlorosulfonated polyethylene latex. Anioinc ammonium salt of alginic acid solution is used as a creaming agent to provide effective creaming function and produce high yield, stable, coagulable ionic chlorosulfonated polyethylene latex. Epoxy resin, sulfur, zinc oxide, rubber accelerators and polymeric hindered phenol antioxidant are used to prepare chlorosulfonated polyethylene latex compositions for making high strength chlorosulfonated polyethylene articles.

1 Claim, No Drawings

COMPOSITION AND METHOD FOR MANUFACTURING CHLOROSULFONATED POLYETHYLENE LATEX AND ARTICLES

THE BACKGROUND OF THE INVENTION

The present invention generally relates to processes and compositions for making polymer latex from solid rubber or slurry of polymer, and more specifically relates to making coagulable dip grade chlorosulfonated polyethylene latex from solid chlorosulfonated polyethylene rubber. The invention also relates to compounding compositions and dip processes for making high strength chlorosulfonated polyethylene latex articles.

Adhesive grade water-based chlorosulfonated polyethylene latex is available commercially; however, it cannot be used to make thick dip articles by coagulation process. The common problems of coagulated films dipped from this type of latex are film cracking, sticky, and/or weak in cured film strength. This type of chlorosulfonated polyethylene latex is suitable for uses as adhesive or straight dip coagulation-free thin film coating. For examples, U.S. Pat. No. 5,281,638 discloses the use of chlorosulfonated polyethylene latex for adhesive applications. Commercial products CSM-450 and CSM-200 chlorosulfonated polyethylene latex made by Sumitomo Seika are also for adhesive and coagulation-free thin film coating applications. There is a need to develop new processes and compositions for making a chlorosulfonated polyethylene latex which can be used for dipping and forming thick, high strength articles by coagulation dipping process. The invention discloses compositions and methods for making chlorosulfonated polyethylene latex that are suitable for dipping articles with thickness up to more than 0.38 mm.

The use of solvent-based chlorosulfonated polyethylene rubber solution to make dip articles is common. However, the production process has several disadvantages. First, the dip process requires the removal of solvent from each individual dip article. This process is highly unfriendly to workers and environment. Secondly, the process cycle time is extremely long. For example, the cycle time for making industrial glove box gloves typically is longer than 12 hours. The invention discloses the compositions and articles made from a coagulable dip grade chlorosulfonated polyethylene latex. The invention reduces article manufacturing cycle time and eliminates the solvent related safety and environmental pollution issues. The cycle time reduction depends on composition and amount of solvent residual in chlorosulfonated polyethylene latex. Generally, the total cycle time for making a 0.38 mm thick dip article is below 3 hours if the solvent residual in chlorosulfonated polyethylene latex is below 500 ppm (parts per million).

SUMMARY OF THE INVENTION

An object of the invention is the use of an organic compound capable of giving rise to anions selected from the group consisting of alkyl sulfonates, aryl sulfonates, alkyl sulfates and aryl sulfates as the emulsifying agent to emulsify solvent-based chlorosulfonated polyethylene rubber solution into a oil-in-water type emulsion. These types of emulsifying agents provide stable chlorosulfonated polyethylene latex. The preferred amount of emulsifier agent is from 0.30 to 0.60 parts per hundred parts of dry chlorosulfonated polyethylene rubber. In example 1 of the invention, sodium dodecylbenzene sulfonate is used as the emulsifying agent.

Another object of the invention is the use of anionic creaming agent such as ammonium salt of alginic acid to induce phase separation to form a high solids content chlorosulfonated polyethylene latex in the bottom layer and a very low solids content serum in the top layer which consists of mainly water, emulsifier, creaming agent and negligible amount of chlorosulfonated polyethylene. In example 2 of the invention, Protamon S (a trade name of FMC Biopolymer) alginate is used as the creaming agent to make high solids content of chlorosulfonated polyethylene latex. First, dilute chlorosulfonated polyethylene latex is mixed with dilute Protamon S alginate solution. The mixture is allowed to stand still at pre-determined temperature for a preset time. Generally, the highest temperature used for creaming dilute chlorosulfonated polyethylene latex is 70 degree C. The higher the creaming temperature, the shorter the creaming time to get a preset percent solids content of the latex in the bottom layer. Protamon S alginate solution is anionic. It provides excellent creaming functions in creaming ionic chlorosulfonated polyethylene latex. Chlorosulfonated polyethylene is heavier than water; therefore, chlorosulfonated polyethylene latex is in the bottom phase of the creaming container. Nonionic creaming agents such as Cellosize (a trade name of Dow Chemical) hydroxyethyl cellulose does not provide the same effective creaming function as ionic ammonium salt of alginic acid in separating chlorosulfonated polyethylene into the bottom latex phase.

Another object of the invention is to disclose the high shear mixing system and process in making homogeneous chlorosulfonated polyethylene emulsion. The system and process are applicable to any polymer that can be dissolved in a solvent at room temperature or elevated temperature. The solution can then be emulsified with the emulsification process of the invention.

Another object of the invention is to disclose the toluene stripping system and process in removing toluene from chlorosulfonated polyethylene emulsion. Any polymer dispersion containing toluene that is stable at the maximum stripping temperature specified in the invention can be processed with the system and process of the invention to remove toluene. The concept and scope of this disclosure can be easily applied to emulsions made of other solvents and polymers by those who have ordinary skill in the art.

Another object of the invention is to disclose the compounding compositions and processes for using chlorosulfonated polyethylene latex to make high strength dip articles. Thick chlorosulfonated polyethylene gloves were made from the invention.

Another object of the invention is to disclose the use of other polymer latex to blend with chorosulfonated polyethylene latex to achieve different flexibility and elasticity of chlorosulfonated polyethylene latex articles. This feature is particularly important for articles requiring comfort in use such as gloves.

DETAILED DESCRIPTION OF THE INVENTION

Solid chlorosulfonated polyethylene rubber can be dissolved in many solvents. The invention example 1 uses toluene to dissolve chlorosulfonated polyethylene. Other solvents suitable for dissolving chlorosulfonated polyethylene and with a boiling point between 50 to 150 degree C. can also be used for the preparation of chlorosulfonated polyethylene solutions. The solution concentration is typically made in the range of 5 to 20%. The solution is added to a reactor of high shear mixing system. An aqueous emulsifier solution is then added and mixed at a low agitation speed to get a homogeneous mixture, wherein said emulsifier is an organic compound capable of giving rise to anions selected from the group consisting of alkyl sulfonates, aryl sulfonates, alkyl sulfates and aryl sulfates. The invention example 1 uses sodium dodecylbenzene sulfonate as the emulsifier. Deionized water or pH adjusted deionized water is added to make the total solids content of the mixture between 3 to 15%. A basic solution such as potassium hydroxide may be added to deionized water so that the pH of the dilute chlorosulfonated polyethylene latex after the removal of solvent is about 2.2 to 5.0. Distilled water can be used to replace deionized water. High shear mixing is then applied to homogenize the emulsion and reduce the particle size of the emulsion to the range of 0.5 to 1.0 micron. High shear mixing can be achieved by using a typical in-line or batch high shear mixer or the combination of both. Toluene in the homogenized dispersion is then stripped by heating and partial vacuum under nitrogen flush. The vacuum system evacuates the vapor of solvent and water, and nitrogen gas through a condenser system to condense the solvent and water. A dry or wet vacuum pump system may be used for the evacuation. In the case of a liquid ring wet vacuum system, the vacuum pump serves as a secondary condenser. Liquid compressant of the liquid ring pump, in intimate contact with the saturated air, condenses most of the vapor that was not previously removed in the condenser. The condensed solvent and water are collected in a reservoir tank for gravitation separation of solvent from water. The recovered solvent is stored for reuse. At the completion of solvent stripping, the dilute chlorosulfonated polyethylene latex is collected in storage containers.

Example 1

In the invention, Hypalon 40 (a trade name of Du Pont Performance Elastomers) solid chlorosulfonated polyethylene rubber chips were dissolved in toluene to obtain a 17.5% solution. 31.8 kilogram rubber solution was charged to the emulsification reactor. 4971 grams of a 5% aqueous solution of sodium dodecylbenzene sulfonate, 98.5 kilograms of deionized water and 35 grams of 9.1% potassium hydroxide solution were added to the reactor. The reactor was equipped with agitators, heating/cooling jacket, temperature sensors and controllers, nitrogen flush line, and a vacuum system. The reactor was connected to a condenser to condense solvent and water vapor. Before solvent stripping, a 0.5 cfm (cubic feet per minute) of nitrogen flow was used to flush the reactor and condenser. Before high shear mixing, the mixture in the reactor was agitated at room temperature at slow speeds (30 to 100 rpm) for 30 minutes. Through an outlet, the mixture in the reactor was fed to a Kady (Kady International) in-line high shear mixer, Model OOCF II, to mill down the particle size of the mixture in the reactor. The flow rate was set at 30 gallons per minute. The output of the Kady mixer was recycled back to the reactor. After two hours of high shear mixing, 59 grams of a 50% polymeric hindered phenol antioxidant dispersion was added to the reactor. The high shear mixing continued for another one hour and 30 minutes. Under a 2 cfm nitrogen flush and a partial vacuum of 250 to 750 mm Hg, the emulsion in the reactor was heated to between 70 and 75 degree C. to evaporate and strip toluene from the emulsion. Stripping continued until the toluene residual in the latex emulsion is below 0.05%. At the end of the stripping, the emulsion was cooled to 30 degree C. before discharging into storage containers. The final dilute chlorosulfonated polyethylene latex has a solids content of 5.2%, a pH of 4.1, a mean particle size of 0.67 microns, and a viscosity of 3 cps.

Although creaming is a common technique for increasing solids content of dilute synthetic polymer latex made from high shear emulsification process, specific polymer emulsion needs specific or unique creaming agents for obtaining high creaming efficiency and low production cost. In the invention, an anionic creaming agent is used to induce phase separation of the dilute chlorosulfonated polyethylene emulsion to form high solids content chlorosulfonated polyethylene latex in the bottom layer and very low solids content serum in the top layer. The anionic creaming agent of the invention achieves high yield in separating ionic chlorosulfonated polyethylene macromolecules into the bottom latex phase. As a comparison, nonionic creaming agent such as Cellosize (a trade name of Dow Chemical) hydroxyethyl cellulose separates lower amount of ionic chlorosulfonated polyethylene into latex phase and leaves higher amount of the emulsified chlorosulfonated polyethylene in the serum phase. In this case, the latex yield is lower and the production cost is higher than the anionic creaming process. Furthermore, serum with high latex residual causes additional issues in discharging or treatment of waste water.

Example 2

The invention discloses the use of anionic creaming agents such as ammonium salt of alginic acid for making high yield stable chlorosulfonated polyethylene latex. Anionic ammonium salt of alginic acid is very compatible and effective in achieving separation of ionic chlorosulfonated polyethylene from other components in the emulsion into the bottom latex layer. Table I compares the creaming efficiency of dilute chlorosulfonated polyethylene latex by ionic Protamon S alginate solution and nonionic Cellosize hydroxyethyl cellulose. Hydroxyethyl cellulose is a common creaming agent for concentrating dilute synthetic polymer emulsions.

TABLE 1

Creaming Efficiency Comparison of the Invention Example

|   | Protamon S alginate | Cellosize QP 100 MH |
|---|---|---|
| % CSE in latex phase (Notes 1 and 2) | 85 | 74 |
| % CSE in serum phase (Notes 1 and 2) | 15 | 26 |
| % CSE in latex phase (Notes 1 and 3) | 82 | 66 |
| % CSE in serum phase (Notes 1 and 3) | 18 | 34 |
| % CSE in latex phase (Notes 1 and 4) | 94 | 82 |
| % CSE in serum phase (Notes 1 and 4) | 6 | 18 |
| % CSE in latex phase (Notes 1 and 5) | 85 | 78 |
| % CSE in serum phase (Notes 1 and 5) | 15 | 22 |

Note 1: CSE is chlorosulfonated polyethylene.
Note 2: Creaming conditions are 75 hours at 14 to 18 degree C.. This creaming process uses 1% creaming agent solution to mix 5.9% dilute CSE latex in a liquid weight ratio of 1.00 to 5.65.
Note 3: Creaming conditions are 9.3 hours at 62 degree C., then 67.5 hours at 20 to 22 degree C.. This creaming process uses 1% creaming agent solution to mix 5.9% dilute CSE latex in a liquid weight ratio of 1.00 to 5.65.
Note 4: Creaming conditions are 112 hours at 13 to 18.5 degree C. plus 22.3 hours at 62 degree C. and then 5 hours at 17 degree C.. This creaming process uses 1% creaming agent solution to mix 5.9% dilute CSE latex in a liquid weight ratio of 1.00 to 2.83.
Note 5: Creaming conditions are 22.3 hours at 62 degree C. and then 5 hours at 17 degree C.. This creaming process uses 1% creaming agent solution to mix 5.9% dilute CSE latex in a liquid weight ratio of 1.00 to 2.83.

Table 1 shows that nonionic Cellosize hydroxyethyl cellulose allows higher amount of chlorosulfonated polyethylene to remain in serum at the termination of creaming process. As a comparison, under all the different creaming parameters and various compositions of creaming agent and dilute chlorosulfonated polyethylene latex, the ionic creaming agent, Protamon S, consistently gives higher yield of chlorosulfonated polyethylene in the creamed latex. The preferred creaming composition of ammonium salt of alginic acid in dilute chlorosulfonated polyethylene latex is from about 3.0 to 8.0 dry weight parts of ammonium salt of alginic acid per 100 dry weight parts of dilute chlorosulfonated polyethylene latex.

The amount of emulsifier used in the emulsification of the organic solution of chlorosulfonated polyethylene rubber is about 0.30 to 0.60 parts per hundred parts of dry chlorosulfonated polyethylene rubber. Insufficient emulsifier amount results in poor emulsification. Excessive emulsifier amount makes emulsification easier but it adversely affects film formation properties of the finish latex if it is not reduced after the emulsification stage and before the finish latex stage.

The chlorosulfonated polyethylene latex made from the invention has high wet gel film strength and can produce thick films free of cracks. For demonstration, dip films were prepared with a 30% calcium chloride coagulant and a 35% chlorosulfonated polyethylene latex containing polymeric hindered phenol antioxidant in an amount of 2 parts per hundred parts of chlorosulfonated polyethylene rubber. Typical glove dipping process was used to make films. The latex films were dried at 55 degree C. to remove water and solvent residual, and then heated at 125 degree C. for 60 minutes. Films with thickness up to 0.020 inches were made without any cracks in both wet film and dry finish film. The films are highly elastic with elongation over 3500%. Upon stretching, it yields at very low stress and continues yielding without breaking even at 3500% elongation. The compositions and methods disclosed in the invention produce chlorosulfonated polyethylene latex suitable for making thick dip articles.

The invention provides chlorosulfonated polyethylene latex compositions useful for making articles with balanced physical properties without using conventional solvent-based chlorosulfonated polyethylene rubber solution. For gloves, the balanced physical properties of high tensile strength and low modulus are preferred product characteristics. For high strength articles, the preferred cross-linking system is the combination of epoxy resin, sulfur, zinc oxide and rubber accelerators. Although zinc oxide is used in the invention examples, calcium hydroxide can be used to replace zinc oxide for the improvement of heat aging properties of the cured vulcanizates. Gloves made according to this invention have their tensile strength and ultimate elongation comparable to those produced from the conventional solvent-based chlorosulfonated polyethylene rubber solution compositions. Other flexible chlorosulfonated polyethylene latex articles such as sleeves, finger cots, probe covers etc. can also be made with this invention.

I. Compositions

The coagulable dip grade chlorosulfonated polyethylene latex made according the invention herein is used for making dip articles.

Metal compounds preferably comprise zinc, magnesium, calcium, cadmium or lead are used in the dip composition of the invention. Their representative compounds are metal oxides, such as magnesium oxide, zinc oxide, calcium oxide, calcium hydroxide, cadmium oxide or lead oxide. Zinc oxide is used in the examples of the invention. The preferred amount of zinc oxide is from about 0.5 to about 5.0 parts per hundred parts of chlorosulfonated polyethylene latex rubber. For articles require better heating aging resistance, calcium hydroxide can be used to replace zinc oxide.

The first cross-linking agent is epoxy resin. The preferred epoxy resin is oxirane, 2,2'-((1-methylethylidene)bis(4,1-phenyleneoxymethylene))bis-,homopolymer. This resin provides flexible cured articles. The preferred amount of cross-linking agent is from about 5 to 35 parts per hundred parts of dry chlorosulfonated polyethylene latex rubber. The use of epoxy resin alone as the cross-linking agent produced articles with high elongation up to 1100%.

In the preferred embodiments, an antioxidant is added to decrease or inhibit oxidation degradation of chlorosulfonated polyethylene latex articles during high temperature curing or long term storage. The required amount of antioxidant depends on cure temperature and cure time. The preferred antioxidant is polymeric hindered phenol (butylated reaction product of para-cresol and dicyclopentadiene). For articles of the invention made from chlorosulfonated polyethylene latex, aqueous anionic dispersion of antioxidant is added to the latex. In preferred embodiments, polymeric hindered phenol is present in the range of about 0.1 to 2.0 parts per hundred parts, more preferably about 0.2 to 1.0 parts per hundred parts of chlorosulfonated polyethylene rubber. Other exemplary antioxidants include polybutylated bisphenol, 2,2'-methylenebis(4-methyl-6-t-butylphenol), and trifunctional hindered phenolic compounds.

II. Methods

The invention discloses methods for preparation of chlorosulfonated polyethylene latex compositions. Dispersions of sulfur, accelerators, metal oxide, antioxidant and deionized water are mixed together first. The epoxy resin dispersion is mixed with chlorosulfonated polyethylene latex. The compounding ingredients dispersion is then added slowly to mildly agitated latex/epoxy resin mixture. Although the above sequence is preferred, it can be properly altered by people have ordinary skill in the art. The compounded latex composition is properly agitated to eliminate air bubbles and it then form a homogeneous dispersion.

For dipping operation, the article formers are cleaned first by dipping in soap solution, wiping with brushes, and rinsing with water. The cleaned formers are dried by heat and then dipped in coagulant. Typical powder-free coagulant consists of calcium salts (calcium nitrate or calcium chloride), surfactant, and water. Modified cornstarch absorbable dusting powder can be added to the powder-free coagulant to make powdered coagulant. The coagulant-coated formers are dried by heating and then dipped in latex composition. The wet latex films on glove formers are partially dried before they are dipped in warm water, typically 40 to 50 degree C., to leach out coagulant salt and other undesirable water-soluble substances. The formers with leached films free of dripping water drops are dipped in stripping lubricant. A proprietary polymer coatings is used as powder free stripping lubricants. The lubricant-coated films on formers are dried at a temperature between 50 and 70 degree C. first and then cured at high temperature in oven. The cure temperature is preferably from about 100 to 150 degree C., more preferably from about 110 to 140 degree C. The cure time is preferably from about 90 minutes to about 20 minutes, more preferably from about 70 minutes to 30 minutes. Lower cure temperature requires longer cure time, and higher cure temperature requires shorter cure time. After cooling down to a temperature that will not hurt the hands of the stripping operator, the cured articles are stripped from their formers.

Example 3

A chlorosulfonated polyethylene latex composition was prepared by mixing all the components together with the amount of each component shown in Table 2. All amounts are expressed in parts per hundred parts (phr) of dry chlorosulfonated polyethylene latex rubber.

TABLE 2

| | |
|---|---|
| Chlorosulfonated polyethylene latex | 100 phr |
| Zinc mercaptobenzothiazole dispersion | 1.5 phr |
| Titanium dioxide dispersion | 0.0 phr |
| Zinc diethyldithiodicarbamate dispersion | 0.5 phr |

TABLE 2-continued

| | |
|---|---|
| Sulfur dispersion | 1.4 phr |
| Polymeric hindered phenol dispersion | 1.1 phr |
| Zinc oxide dispersion | 5.0 phr |
| Ancarez AR550 epoxy resin dispersion | 25.1 phr |

Deionized (or distilled) water: the quantity needed was to make the solids content of the compounded latex composition to about 40.4%.

The mixture in the dipping container is agitated at low degree of agitation so the motion was sufficient to prevent segregation of components but not strong enough to induce air bubbles and latex instability. Generally after an overnight agitation, the composition was ready for dipping.

Formers were cleaned in a detergent solution, brushed, and rinsed. The formers were heated, dried completely. The formers at a temperature between 70 to 80 degree C. were dipped into an aqueous coagulant containing 20 to 30% calcium chloride and a 0.03 to 0.05% Triton X-100 nonionic surfactant. The coagulant-coated formers were heated, dried completely. The formers at a temperature between 50 to 80 degree C. were dipped into the latex composition. The dry coagulant induced the aggregation of chlorosulfonated polyethylene latex to form a film around the formers. The dwell time of the formers in the latex was used to control the thickness of the dip films. After the latex film got a proper partial drying to develop wet gel strength and water dissolution resistance, the latex-coated formers were dipped into warm water to leach out coagulant salt and undesirable water-soluble substances. They were then dipped into a proprietary powder-free coating lubricant. The lubricant forms only a very thin layer on the latex film and it practically will not affect the physical strength of the cured film. The formers with lubricant-coated latex films were dried at room temperature first. The films were then cured sequentially at 85 degree C. for 20 minutes, 105 degree C. for 20 minutes, and finally at 125 degree C. for 60 minutes. After the curing process, the formers were taken out the cure oven and allowed to cool down for stripping. The method produced powder-free articles.

The tensile properties of chlorosulfonated polyethylene latex film made from composition and process of the Example 3 described above were tested and shown in Table 3 below:

TABLE 3

| | |
|---|---|
| Tensile strength | 18 MPa (2600 PSI) |
| Ultimate elongation | 850% |

Example 4

By adding Hartex 101 (a trade name of Firestone Latex) natural latex in an amount of 15.1 parts per hundred parts of chlorosulfonated polyethylene and Neoprene 750 (a trade name of Du Pont Performance Elastomers) in amount of 15.1 parts per hundred parts of chlorosulfonated polyethylene to the composition of Example 3, the solids content of the new composition became 40.3%. The tensile property of the cured film is shown in Table 4 below.

TABLE 4

| | |
|---|---|
| Tensile strength | 19.4 MPa (2819 PSI) |
| Ultimate elongation | 785% |

Although compositions and methods for manufacturing coagulable dip grade chlorosulfonated polyethylene latex and for making chlorosulfonated polyethylene articles are used as examples in this specification, the concept and scope of this invention are applicable to make other polymer latexes and articles. These and other modifications and variations to the present invention may be practiced by those who have ordinary skill in the art, without departing from the concept and scope of the present invention, which are described above. Furthermore, it should be understood that the foregoing description is by the way of example only and is not intended to limit the invention, and that aspects of various embodiments may be interchanged in whole or in part.

The invention claimed is:

1. An elastomeric latex article comprising the product of a coagulable, film forming elastomeric chlorosulfonated polyethylene and an epoxy resin, wherein the epoxy resin comprises oxirane, 2,2'-((1-methylethylidene)bis(4,1-phenyleneoxymethylene))bis-,homopolymer epoxy resin in a preferred amount ranging from about 5.0 to 35.0 parts per hundred parts of chlorosulfonated polyethylene.

* * * * *